US008323542B2

(12) United States Patent
Argoitia et al.

(10) Patent No.: US 8,323,542 B2
(45) Date of Patent: Dec. 4, 2012

(54) SUBSTRATE AND METHOD OF MANUFACTURING POLYGON FLAKES

(75) Inventors: Alberto Argoitia, Santa Rosa, CA (US); Vladimir P. Raksha, Santa Rosa, CA (US); Cornelis Jan Delst, Fairfax, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/938,304

(22) Filed: Nov. 2, 2010

(65) Prior Publication Data

US 2011/0101560 A1 May 5, 2011

Related U.S. Application Data

(60) Provisional application No. 61/257,664, filed on Nov. 3, 2009.

(51) Int. Cl.
*B01J 2/24* (2006.01)

(52) U.S. Cl. ...................................................... 264/144

(58) Field of Classification Search ................... 264/144
See application file for complete search history.

(56) References Cited

U.S. PATENT DOCUMENTS

| | | | |
|---|---|---|---|
| 4,705,356 A | 11/1987 | Berning et al. | 359/590 |
| 4,838,648 A | 6/1989 | Phillips et al. | 359/585 |
| 5,100,599 A * | 3/1992 | Gurnick et al. | 264/81 |
| 5,571,624 A | 11/1996 | Phillips et al. | 428/403 |
| 6,376,018 B1 | 4/2002 | Kittler, Jr. | 427/294 |
| 6,586,098 B1 | 7/2003 | Coulter et al. | 428/403 |
| 6,815,065 B2 | 11/2004 | Argoitia et al. | 428/403 |
| 6,838,166 B2 | 1/2005 | Phillips et al. | 428/323 |
| 7,258,915 B2 | 8/2007 | Argoitia et al. | 428/323 |
| 7,550,197 B2 | 6/2009 | Kittler, Jr. et al. | 428/323 |
| 2005/0019575 A1 | 1/2005 | Jungnitz et al. | 428/403 |
| 2008/0107856 A1 * | 5/2008 | Argoitia et al. | 428/43 |
| 2009/0072185 A1 | 3/2009 | Raksha et al. | 252/62.51 R |

OTHER PUBLICATIONS

European Search Report from corresponding EP application No. 10189699.1, dated Feb. 6, 2012

* cited by examiner

*Primary Examiner* — Yogendra Gupta
*Assistant Examiner* — Alison Hindenlang
(74) *Attorney, Agent, or Firm* — Matthew A. Pequignot; Pequignot + Myers LLC (57) ABSTRACT

A method of forming pigment flakes includes using a deposition substrate having a plurality of regions; some of the regions are raised or lowered so that there is a level difference between each two adjacent regions. A coating deposited onto this substrate breaks along region borders when it is separated from the substrate. In one embodiment, the substrate includes first and second regions, wherein each of the first regions is in an abutting relationship with at least one of the second regions. All the first regions are at a first level and all the second regions are at a second level, and the difference between the first and second levels is greater than a predetermined value. The first and second regions are preferably square-shaped regions for manufacturing square flakes with practically no debris.

15 Claims, 7 Drawing Sheets

```
providing a substrate with a surface having a plurality
of regions, some of the regions raised or lowered with
respect to an average level plane associated with the
surface, wherein, for each two regions in an abutting
relationship, a level of a first of the two regions is
different from a level of a second of the two regions
```
210

```
providing a coating onto the substrate
```
220

```
removing the coating from the substrate and breaking the
coating into the shaped flakes
```
230

SUBSTRATE AND METHOD OF MANUFACTURING POLYGON FLAKES

CROSS-REFERENCE TO RELATED APPLICATIONS

The present invention claims priority from U.S. Provisional Patent Application No. 61/257,664 filed Nov. 3, 2009, which is incorporated herein by reference.

TECHNICAL FIELD

The present invention relates to pigment flakes and, more particularly, to a method of manufacturing polygon flakes.

BACKGROUND OF THE INVENTION

Pigment flakes formed of one or more thin film layers have been developed for a wide variety of applications. For example, magnetic pigments are used in products ranging from security devices to decorative cookware. Similarly, color shifting pigments are used in cosmetics, anti-counterfeiting inks, automobile paints, and so on. Various thin-film flakes and methods of their manufacturing are disclosed e.g. in U.S. Pat. Nos. 5,571,624, 4,838,648, 7,258,915, 6,838,166, 6,586,098, 6,815,065, 6,376,018, 7,550,197, 4,705,356 incorporated herein by reference.

The pigment flakes are conventionally manufactured using a layered thin film structure formed on a flexible web, also referred to as a deposition substrate. The various layers are deposited on the web by methods well known in the art of forming thin coating structures, such as Physical and Chemical vapor deposition and the like. The thin film structure is then removed from the web material and broken into thin film flakes, e.g. color shifting flakes, which can be added to a polymeric medium such as various pigment vehicles for use as ink, paint, or lacquer.

Figure 1:
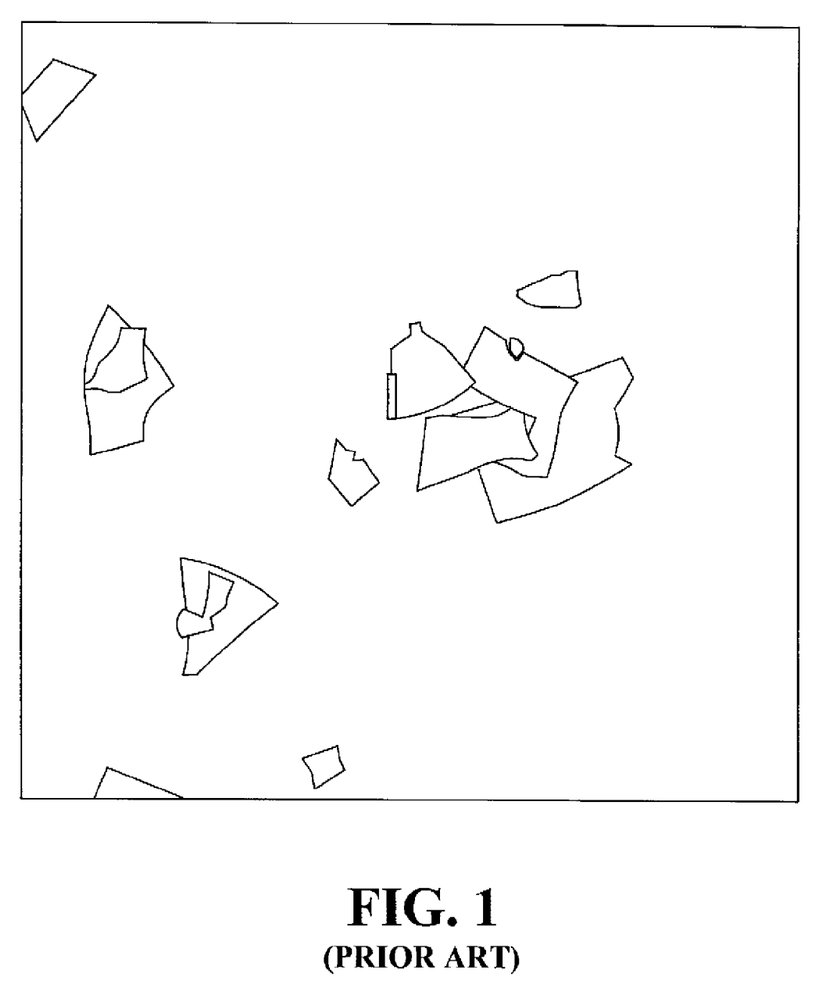
FIG. 1 is a microphotograph-based illustration irregular-shaped flakes manufactured using a conventional method.

In the process of removing the deposited layer(s) from the deposition substrate, the coating breaks into flakes, which may further be reduced in size, e.g. by milling. The random breakage of the coating results in irregularly-shaped and irregularly-sized flakes as shown in FIG. 1. One of disadvantages of this approach is the presence of flakes which are too small for a particular application. By way of example, flakes having a diameter of less than 3 microns diminish optical effects of the final product coated with the pigment flakes. Sieves are conventionally used in order to remove flakes of undesired size, or debris. However, using sieves adds complexity to the flakes manufacturing process and results in wasting a portion of deposited material. Accordingly, it is desirable to increase utilization of coating materials, decrease waste, and lessen complexity of flakes manufacturing process.

Furthermore, in some applications, the shape of pigment flakes is important. By way of example, flakes of a particular shape may be used as taggants, or markers, in security or anti-counterfeiting applications as taught in U.S. Pat. No. 7,258,915.

It is known that planar non-magnetized magnetic flakes align in a magnetic field with their long axes parallel to flux lines of the magnetic field. When magnetic flakes have a diffraction grating thereon, it is highly desirable to coordinate the directions of the grating and of the long axis and, thus, to have control over the flake's shape.

U.S. Patent Appl. No. 20090072185 describes a higher reflectivity coating formed of square-shaped flakes assembled into ribbons.

Figure 2:
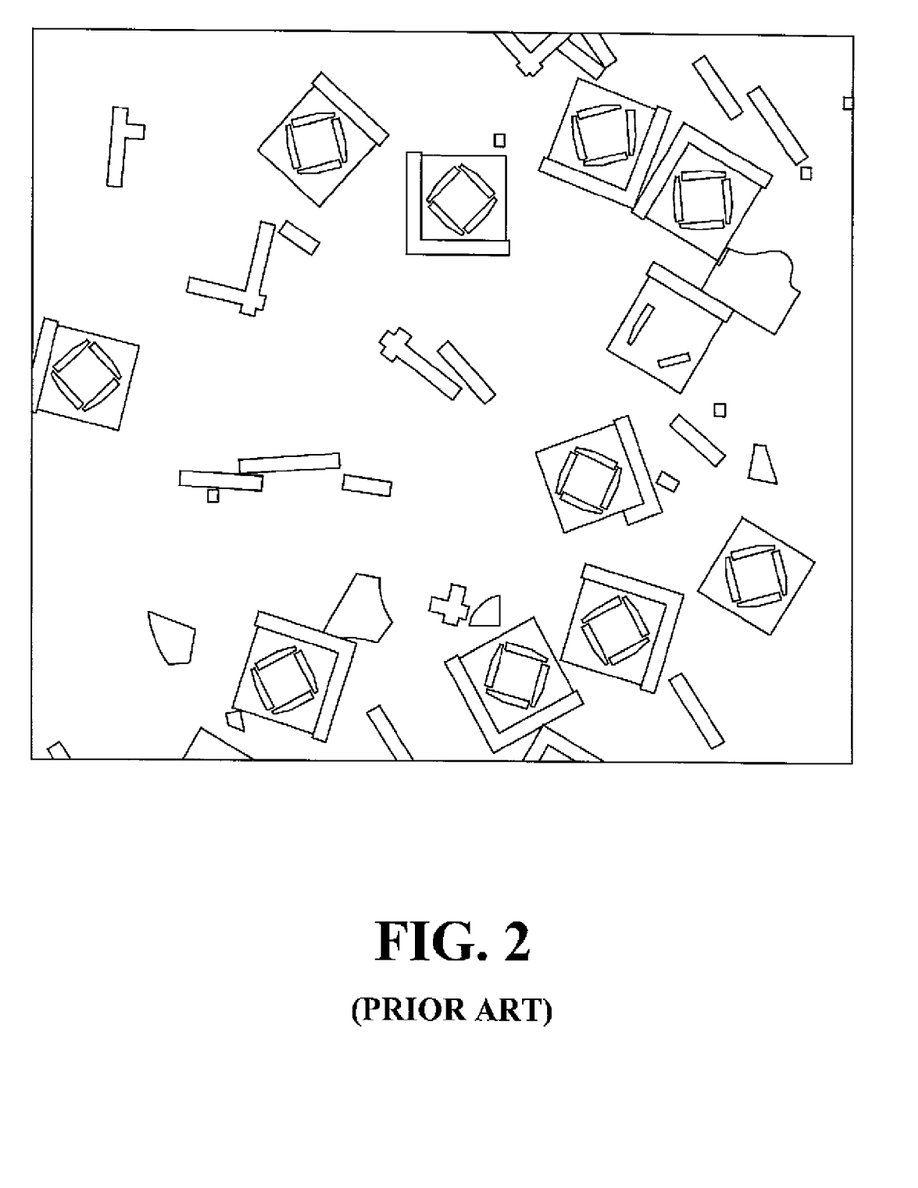
FIG. 2 a microphotograph-based illustration square-shaped flakes manufactured using a conventional method.

In a conventional method of manufacturing shaped flakes, a deposition substrate is embossed with frames so as to induce breaking of the coating and to obtain shaped flakes. The resulting flake mixture includes leftover frames separated from the flakes. By way of example, FIG. 2 shows 8×8 microns pigment flakes with a large number of broken frames which have been separated from the flakes during post-processing. Thus, this method produces a significant amount of undesirable debris in the form of flake frames.

An object of the present invention is to provide a method of manufacturing shaped thin-film flakes which produces practically no debris.

SUMMARY OF THE INVENTION

Accordingly, the present invention relates to a method of forming pigment flakes which includes providing a substrate with a surface having a plurality of regions, some of the regions raised or lowered with respect to an average level plane associated with the surface, wherein, for each two regions in an abutting relationship, a level of a first of the two regions is different from a level of a second of the two regions; providing a coating onto the substrate; and, removing the coating from the substrate and breaking the coating into the pigment flakes.

One aspect of the present invention relates to using a substrate which includes first and second regions, wherein each of the first regions is in an abutting relationship with at least one of the second regions. All the first regions are at a first level and all the second regions are at a second level, and the difference between the first and second levels is greater than a predetermined value. The first and second regions are preferably square-shaped regions for manufacturing square flakes with practically no debris.

BRIEF DESCRIPTION OF THE DRAWINGS

The invention will be described in greater detail with reference to the accompanying drawings which represent preferred embodiments thereof, wherein.

DETAILED DESCRIPTION

Figure 3:
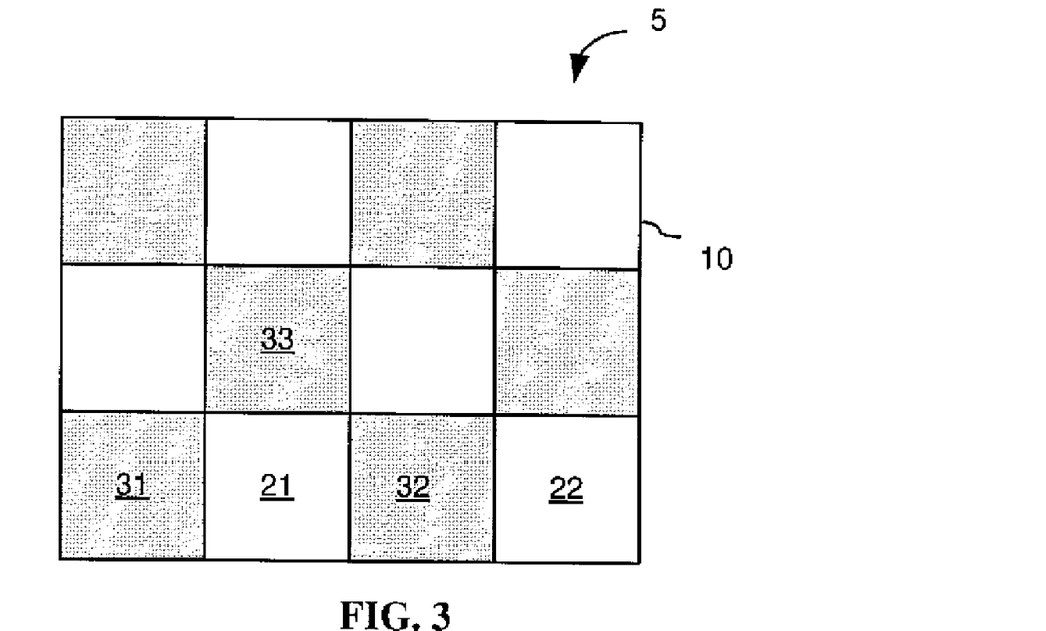
FIG. 3 is a top plan view of a substrate in accordance with one embodiment of this invention.
Figure 4:
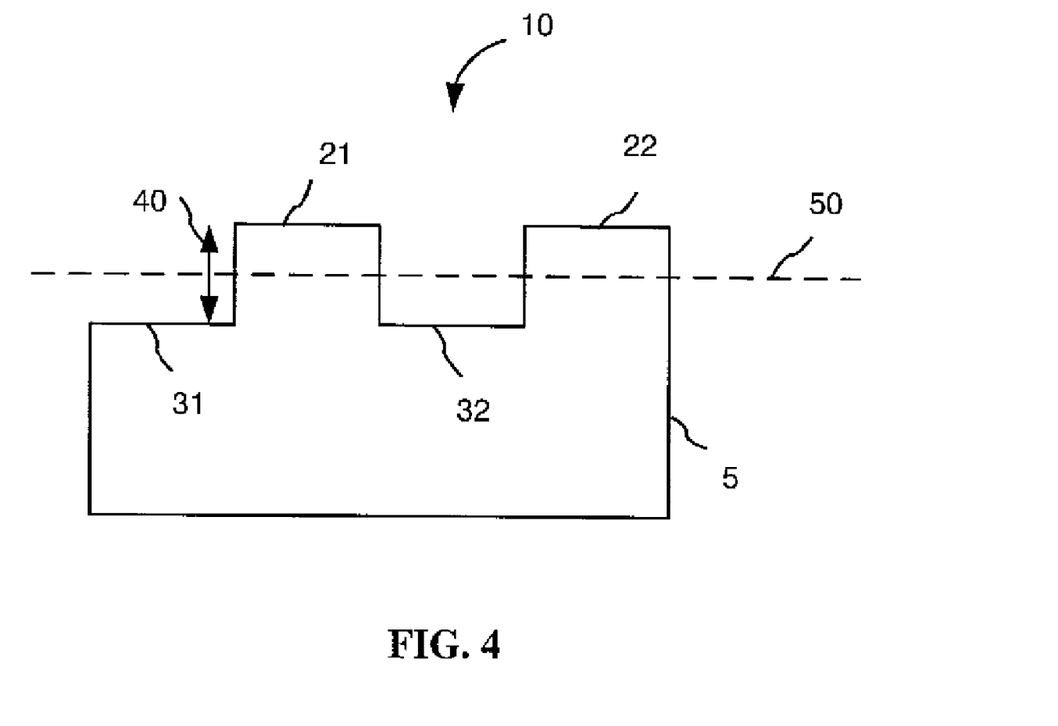
FIG. 4 is a cross-section of the substrate shown in FIG. 3.

The method of this invention includes using a substrate which has flake-size regions located at different levels. With respect to two regions on a surface of the substrate, the term "abutting relationship" means that regions' projections onto an average level plane associated with the surface are in direct contact and share an extended portion of their borders. By way of example, regions 21 and 31 shown in FIGS. 3 and 4 are in an abutting relationship, whereas regions 31 and 33 are not because they touch only by corners. According to this invention, each two regions which are in an abutting relation are at different levels with respect to the average level of the surface.

Any known in the art method may be used for deposition of one or more thin film layers onto the surface of the substrate and, then, for removing the coating from the substrate and separating it into flakes. The level difference between two abutting regions results in a fragile area in the coating. Thus, after the coating is separated from the substrate, it breaks along the region borders. Preferably, the flakes are formed of inorganic materials because their thin film layer or layers are brittle and would easily break along the region borders.

This method provides pigment flakes which take on the shape of the substrate regions. Since a coating tends to break along straight lines, regions with straight borders, i.e. polygons, yield better results than regions with curved borders. However, a substrate having regions with curved borders may also be used if desired.

Advantageously, the method produces almost no debris apart from accidently broken flakes.

With reference to FIG. 3, a surface 10 of a deposition substrate 5 has a series of plateaus and valleys, such as plateaus 21 and 22 and valleys 31 and 32. FIG. 4 shows a partial cross-section of the substrate 5. In this embodiment, all the plateaus are at a same first level with respect to e.g. an average level plane 50 associated with the substrate surface 10. Similarly, all the valleys are at a same second level with respect to the average level plane 50, with the difference, of course, that the plateaus are raised and the valleys are lowered relative to the average level plane 50.

The difference 40 between the levels of the plateaus and valleys, i.e. the first and second levels, may be in the range of from 50 to 1000 nm, preferably between 300 and 500 nm.

In other words, the substrate 5 has a plurality of plateaus and valleys, wherein the plateaus and valleys are polygons, any two plateaus may touch one another only by corners, any two valleys may touch one another only by corners, and any pair of a plateau and a valley adjacent to each other have the level difference 40 greater than a predetermined value.

Figure 5:
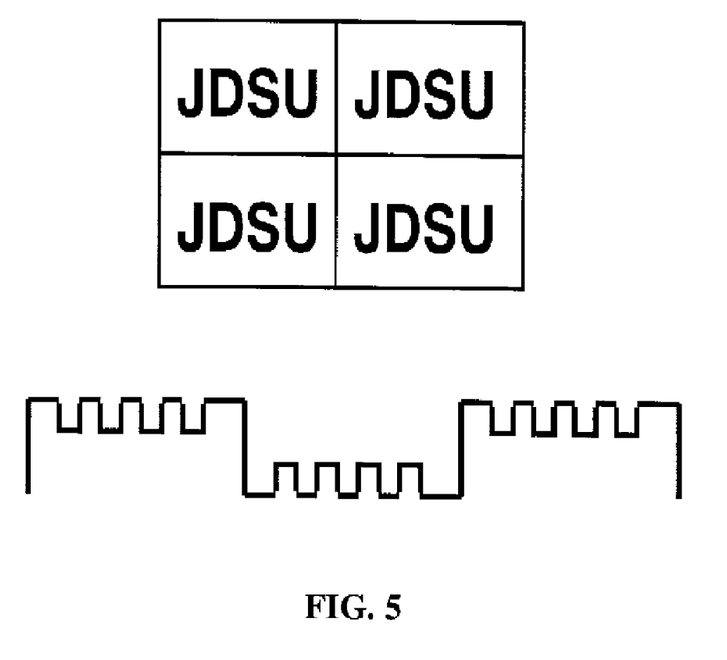
FIG. 5 schematically shows a top plan view and a cross-section of a substrate in accordance with one embodiment of the invention.
Figure 6:
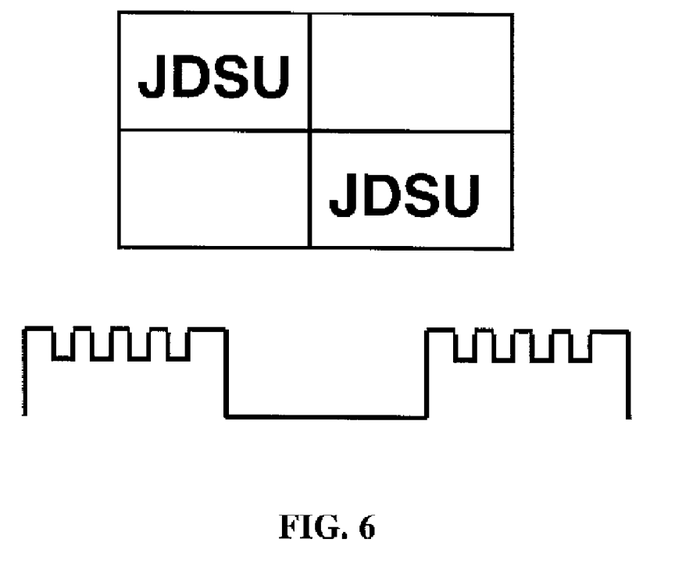
FIG. 6 schematically shows a top plan view and a cross-section of a substrate in accordance with one embodiment of the invention.

At least some of the plateaus and/or valleys may have markings such as logos, symbols, or grating embossed, etched, etc. therein or protruding therefrom. FIGS. 5 and 6 schematically illustrate substrates such as shown in FIGS. 3 and 4, but with added symbols. FIG. 5 shows markings are depressed in the plateau regions and protruding from the valley region. Of course, the situation can be reversed, or all regions may have protruding markings, or all regions may have depressed markings. In FIG. 6, symbols have been formed in some but not all of the flake-forming regions of the substrate. The depth or height of markings is less than the difference of levels between adjacent regions, so as to facilitate that the flakes break along the lines between plateaus and valleys and not across the symbols inside the flakes. Preferably, the depth or height of markings is no greater than ⅔ of the difference in levels between the region having a particular marking and the adjacent regions.

The substrates shown in FIGS. 5 and 6 provide shaped flakes having symbols or logos for authentication and anti-counterfeiting purposes. Alternatively, the plateaus and/or valleys can have diffraction grating for forming shaped diffractive flakes.

Figure 7:
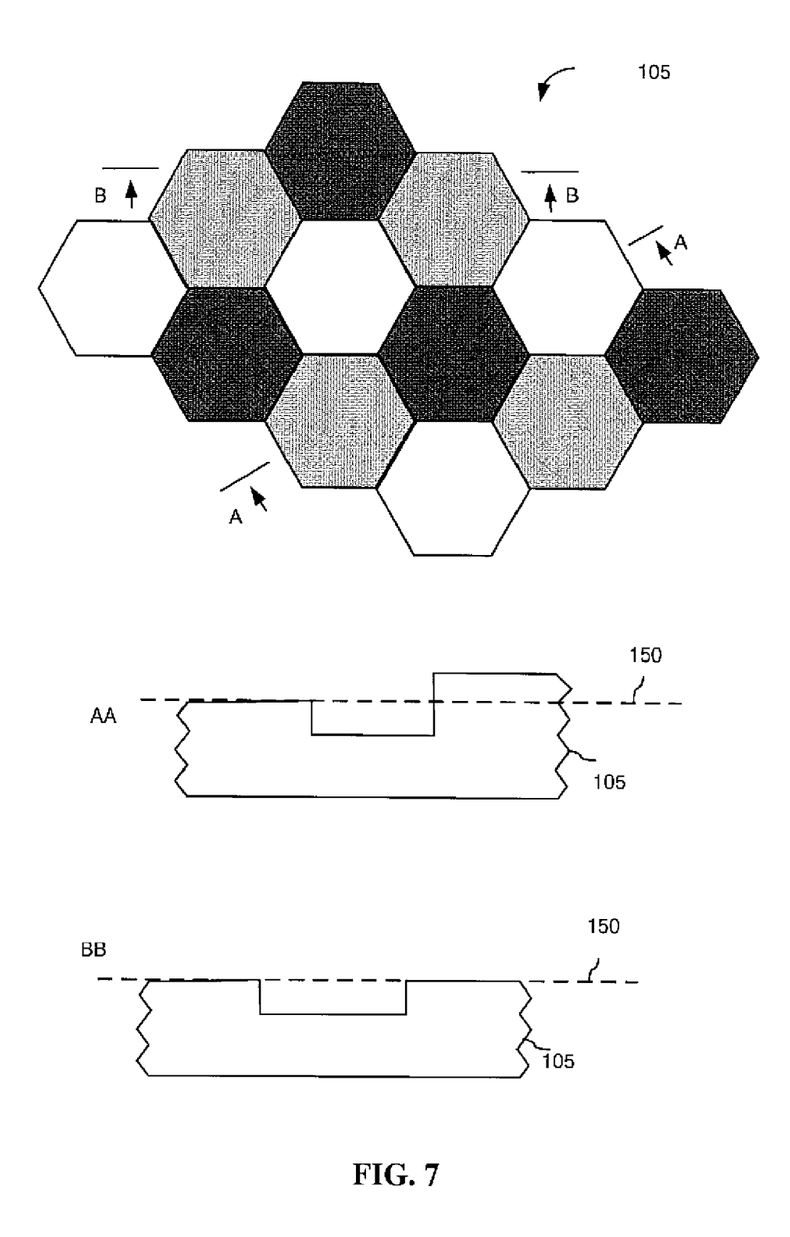
FIG. 7 is a top plan view and two cross-section views of a substrate having hexagonal flake-forming regions in three levels.

With reference to FIG. 7, a substrate 105 has a plurality of hexagon flake-forming regions in three levels. For illustrative purposes, regions of a same level are shown as having a same shade of gray color. A cross-section AA shows three adjacent regions in different levels with respect to an average level plane 150. For each two regions in an abutting relationship, a level of a first of the two regions is different from a level of a second of the two regions; a difference in levels between the two abutting regions is within same boundaries as the difference 40 shown in FIG. 4.

Figure 8:
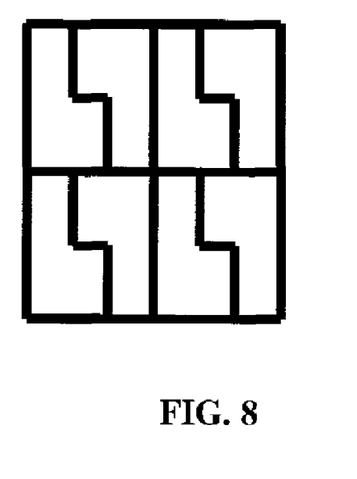
FIG. 8 is a plan view of a substrate with a tessellated pattern of flake-forming regions.
Figure 9:
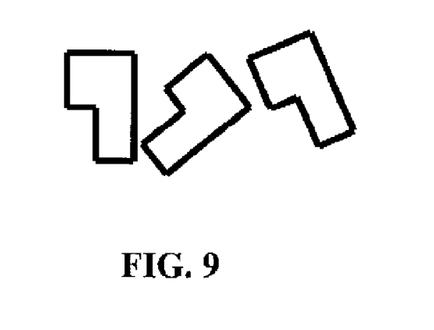
FIG. 9 illustrates flakes formed using the substrate shown in FIG. 8.

The flake-forming regions may be squares, triangles, rhombuses and other polygons. By way of example, the regions may form a tessellated pattern shown in FIG. 8 which yields flakes shown in FIG. 9. The regions may have a same shape or different shapes, e.g. be different polygons. Multiple regions may be at a same level as described above with reference to FIGS. 4 and 7, or be at different levels. However, for each two regions in an abutting relationship, a level of a first of the two regions is different from a level of a second of the two regions, and the difference between the two levels is sufficient for providing breakage of the deposited coating the same way as the level difference 40 shown in FIG. 4.

Figure 10:
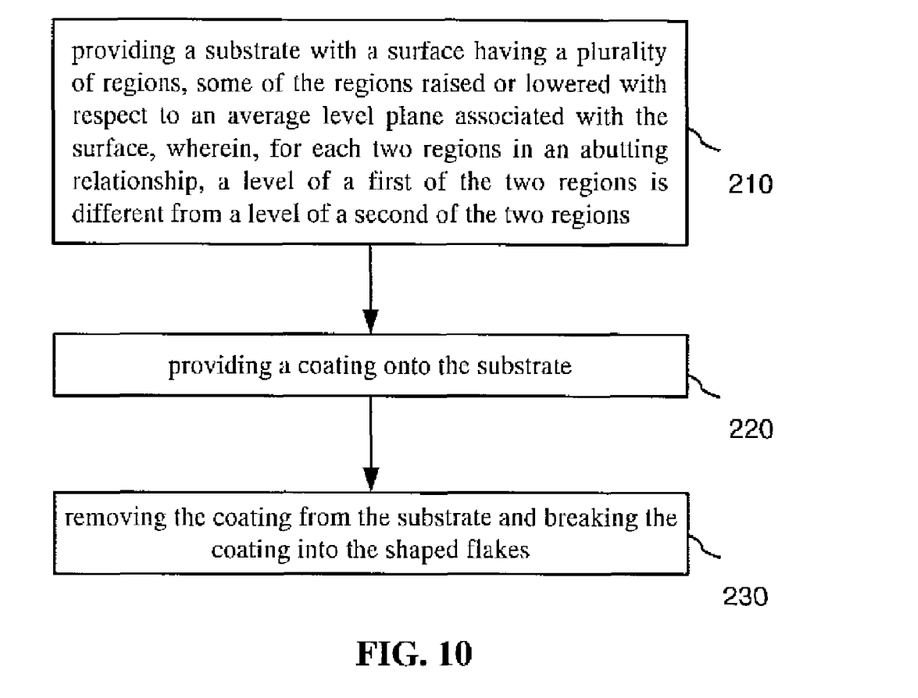
FIG. 10 is a flowchart of the method of this invention.

With reference to FIG. 10, the method of this invention includes a substrate-providing step 210. The substrate has flake-forming regions wherein each two regions in an abutting relationship, i.e. sharing a border, are at different levels as described above.

The difference 40 between the levels of the two abutting regions may be in the range of from 50 to 1000 nm, preferably between 300 and 500 nm. The regions may have a diameter between 3 microns and 200 microns, corresponding to the size and shape of desired flakes.

The substrate may be an embossed or cast plastic sheet, such as a roll of polyethylene terephthalate (PET) or polycarbonate; alternatively, the substrate may be made of a rigid material such as made of glass, quartz, silicon, nickel, aluminum. The flake-size regions on the substrate can be formed using different technologies, such as diamond engraving, masking, direct laser writing, e-beam writing, laser interference, lithographic and holographic methods, etc. In one method of forming the substrate, the process starts with making a master e.g. by using a lithographic technique. The master may be made of quartz, silicon, photoresist-coated glass, etc. Depending on the material, it is possible to use direct engraving, laser, electron beam origination, masking/etching, etc. processes. A shim, typically made of nickel, is produced using the master. Then the shim is recombined to produce a larger production shim which is used to create the microstructure in a polymeric substrate by embossing or casting.

The back of the substrate may be either planar or replicating to some extent the multi-leveled profile of the surface wherein the regions are formed.

The substrate may be coated with a release layer formed e.g. of a refined paraffin wax Or water-soluble material, such as CaO, $CaF_2$, $Na_3AlF_6$ (cryolite), $NaNO_3$, and NaCl; other materials might be released using an acid solution, a basic solution, or other solvent, including organic solvents.

The method of forming pigment flakes further includes a coating-deposition step 220 when one or more thin-film layers or preferably inorganic material(s) are deposited onto the substrate using conventional deposition techniques so as to provide a coating onto the substrate.

By way of example, the coating includes a cobalt-nickel layer between two aluminum layers, each of the layers is about 100 nm thick, for forming reflective magnetic flakes for use as described in U.S. Patent Appl. No. 20090072185.

By way of example, flakes with a thickness of up to 1500-2000 nm may be manufactured using a substrate with the difference of levels of about 100-200 nm. In another example a single-layer or multilayer coating that is 50 nm to 1000 nm thick may be formed on a substrate with a plateau/valley height of 300-400 nm for producing shaped flakes with protruding or depressed markings with heights in the order of 20 to 300 nm; preferably the depth or height of the markings is no greater than ⅔ of the difference in levels between the region having a particular marking and the adjacent regions. In some cases one or more releasing layers are added between the material layers chosen for the flakes to make multiples flakes with the same substrate area.

A separation step 230 includes removing the coating from the substrate and breaking the coating into flakes.

Figure 11:
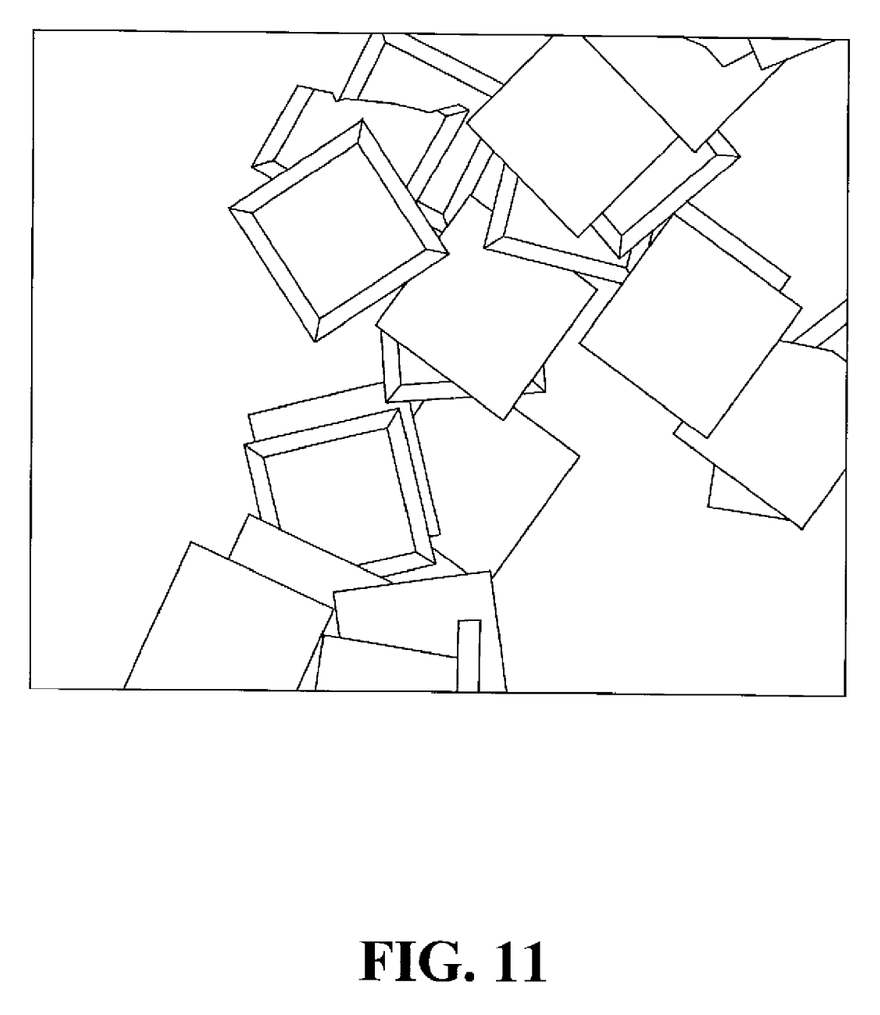
FIG. 11 a microphotograph-based illustration of flakes obtained by the method of this invention.

FIG. 11 illustrates a microphotograph of square 20×20 micron flakes obtained using the method described with reference to FIG. 10; the substrate is one shown in FIGS. 3 and 4. Advantageously, almost no debris is present in the flake mixture since no frames are formed around the flakes. This feature is particularly important for relatively small flakes. The smaller are the flakes, the greater is the ratio of the frames area to the area of flakes and, thus, the amount of frames leftovers or "debris." By way of example, the length of frames produced by 8×8 microns square flakes is twice the length generated by 24×24 microns flakes.

The flakes produced with this method can be made from materials that provide different flake functionalities for specific applications. For example, the optical designs and microstructures of the deposited single or multilayer structures can be transparent or opaque in the visible, UV or IR portions of the electromagnetic spectrum. The materials, microstructures and shapes of the manufactured flakes can be chosen to be responsive to different fields (i.e. electrical or magnetic) allowing for their orientation under external fields during different coating applications.

We claim:

1. A method of forming pigment flakes comprising:
providing a substrate with a surface having a plurality of regions, some of the regions raised or lowered with respect to an average level plane associated with the surface, wherein, for each two regions in an abutting relationship, a level of a first of the two regions is different from a level of a second on the two regions;
providing a coating onto the substrate, wherein the thickness of the coating is greater than a difference between levels of regions of the substrate; and,
removing the coating from the substrate and breaking the coating along region borders into the pigment flakes, wherein shapes of the pigment flakes are predetermined shapes corresponding to shapes of the regions.

2. The method as defined in claim 1 wherein the plurality of regions comprises:
first regions at a first level with respect to the average level plane, and
second regions at a second level with respect to the average level plane, wherein the first level is different from the second level.

3. The method as defined in claim 2 wherein the plurality of regions comprises:
third regions at a third level with respect to the average level plane,
wherein the third level is different from the first and second levels.

4. The substrate as defined in claim 2 wherein a difference between the levels of the first and second regions is at least 50 nm.

5. The method as defined in claim 2 wherein a difference between the levels of the first and second regions is between 300 and 500 nm.

6. The method as defined in claim 1 wherein the regions are polygon-shaped regions.

7. The method as defined in claim 6 wherein the polygon-shaped regions are squares.

8. The method as defined in claim 6 wherein the polygon-shaped regions are hexagons.

9. The method as defined in claim 6 wherein the polygon-shaped regions are triangles.

10. The method as defined in claim 6 wherein the plurality of polygon-shaped regions comprises differently shaped regions.

11. The method as defined in claim 1 wherein at least some of the regions have markings.

12. The method as defined in claim 11 wherein, for each region having one of the markings, a depth or height of said markings is no greater than ⅔ of the difference in levels between the region having a particular marking and the adjacent regions.

13. The method as defined in claim 1 wherein the substrate has a release layer thereon.

14. The method as defined in claim 13 wherein the coating includes a second release layer.

15. The method of claim 1 wherein the coating is formed of one or more inorganic materials.

* * * * *